United States Patent
Kashyap et al.

(10) Patent No.: US 9,927,006 B2
(45) Date of Patent: Mar. 27, 2018

(54) MULTI-SPEED PLANETARY DRIVE FOR A SUPERCHARGER

(71) Applicant: Achates Power, Inc., San Diego, CA (US)

(72) Inventors: Sumanth Kashyap, San Diego, CA (US); Balazs V. Palfai, Foster City, CA (US)

(73) Assignee: ACHATES POWER, INC., San Diego, CA (US)

( * ) Notice: Subject to any disclaimer, the term of this patent is extended or adjusted under 35 U.S.C. 154(b) by 418 days.

(21) Appl. No.: 14/841,969

(22) Filed: Sep. 1, 2015

(65) Prior Publication Data

US 2017/0059008 A1    Mar. 2, 2017

(51) Int. Cl.
| | |
|---|---|
| *F16H 3/54* | (2006.01) |
| *F02B 39/12* | (2006.01) |
| *F02B 39/16* | (2006.01) |
| *F02B 39/04* | (2006.01) |
| *F02B 67/10* | (2006.01) |

(52) U.S. Cl.
CPC .............. *F16H 3/54* (2013.01); *F02B 39/04* (2013.01); *F02B 39/12* (2013.01); *F02B 39/16* (2013.01); *F02B 67/10* (2013.01); *F16H 2200/0034* (2013.01); *F16H 2200/2005* (2013.01); *F16H 2200/2035* (2013.01); *F16H 2200/2066* (2013.01); *F16H 2200/2082* (2013.01)

(58) Field of Classification Search
CPC .. F16H 3/54; F02B 39/04; F02B 39/12; F02B 67/10
See application file for complete search history.

(56) References Cited

U.S. PATENT DOCUMENTS

| | | | |
|---|---|---|---|
| 2,034,087 | A | 3/1936 | Chilton |
| 2,242,374 | A | 5/1941 | Schultz et al. |
| 4,530,339 | A | 7/1985 | Oguma et al. |
| 6,082,340 | A | 7/2000 | Heimark |
| 6,609,505 | B2 | 8/2003 | Janson |
| 7,055,507 | B2 | 6/2006 | Kelley, Jr. |

(Continued)

FOREIGN PATENT DOCUMENTS

WO    WO-2009/068882 A2    6/2009

OTHER PUBLICATIONS

International Search Report dated Oct. 21, 2016 for PCT application No. PCT/US2016/047263.

*Primary Examiner* — Derek D Knight
(74) *Attorney, Agent, or Firm* — Terrance A. Meador (57) ABSTRACT

A multi-speed drive for a supercharger includes a planetary gear mechanism with a sun gear mechanism, a plurality of planet gears mounted on a planet carrier, and a ring gear, all mounted for rotation on a stationary shaft. A rotary-mechanical drive input is received by either the ring gear or the planetary drive, and a rotary-mechanical drive output is provided by the planetary drive when the ring gear receives the input, or by the ring gear when the planetary drive receives the input. A one-way roller clutch is disposed coaxially with the planetary gear mechanism, between the sun gear mechanism and the stationary shaft. A hydraulically-actuated, clutch assembly mounted coaxially with the planetary gear mechanism on the stationary shaft engages the sun gear and the ring gear to change the gear ratio of the drive.

15 Claims, 5 Drawing Sheets

(56) References Cited

U.S. PATENT DOCUMENTS

| | | |
|---|---|---|
| 7,727,110 B2 | 6/2010 | MIller et al. |
| 8,496,554 B2 | 7/2013 | Pohl et al. |
| 8,613,271 B2 | 12/2013 | Deng et al. |
| 2002/0096156 A1* | 7/2002 | Palazzolo ............... F02B 39/04 123/559.1 |
| 2004/0038769 A1 | 2/2004 | Eibler |
| 2011/0115320 A1 | 5/2011 | Palfai et al. |
| 2011/0115321 A1 | 5/2011 | Chamberlin et al. |
| 2012/0125149 A1 | 5/2012 | Palfai et al. |
| 2012/0186565 A1 | 6/2012 | Arima et al. |
| 2014/0096642 A1 | 4/2014 | Gray et al. |
| 2014/0373814 A1 | 12/2014 | Herold et al. |

* cited by examiner

MULTI-SPEED PLANETARY DRIVE FOR A SUPERCHARGER

FIELD OF THE INVENTION

The field of the invention is a drive with a variable transmission for controlling the speed of a supercharger of an internal combustion engine. More particularly, the field relates to driving a supercharger at multiple speeds using a planetary gear assembly.

BACKGROUND OF THE INVENTION

An internal combustion engine requires different amounts of intake air under different operating conditions. For example, in order to increase engine speed, the air handling system may be required to increase (boost) the pressure (or density) of intake air so as to provide more oxygen to burn more fuel, thereby increasing the power delivered by the engine. To pressurize intake air on demand, the air handling system may include a supercharger, which is an air compressor driven by a mechanical coupling to an engine crankshaft. However, if a supercharger is designed for operation at low engine speeds, the supercharged intake air pressure at high speeds may be higher than necessary for optimal operation. Similarly, if the supercharger is designed for operation at high engine speeds, the supercharged intake air pressure will be insufficient to generate sufficient torques at low speeds. Therefore, there is need for a drive device that allows the supercharger to operate efficiently at both high and low engine speed conditions.

In modern vehicles such as trucks and automobiles, engine compartment space for auxiliary devices such as superchargers may be very limited. The room available for a supercharger drive may be further limited due to a need to locate the supercharger in close proximity to a crankshaft for coupling. So it is desirable that a multi-speed drive for a supercharger be as compact as possible while providing functionality which enables multi-speed supercharger operation. This is achieved in the supercharger drive embodiments described below by using a planetary gear-set and a multi-disc clutch mechanism mounted for rotation on a stationary shaft.

SUMMARY OF THE INVENTION

One aspect of the invention relates to a multi-speed drive for a supercharger having a planetary gear mechanism with a sun gear assembly, a plurality of planet gears mounted on a planet carrier, and a ring gear, all mounted for rotation on a stationary shaft. A rotary-mechanical drive input is received by either the ring gear or the planet carrier, and a rotary-mechanical drive output is provided by the planet carrier when the ring gear receives the input, or by the ring gear when the planet carrier receives the input. A one-way roller clutch is disposed coaxially with the planetary gear mechanism, between the sun gear assembly and the stationary shaft. A hydraulically-actuated, multiplate clutch assembly mounted coaxially with the planetary gear mechanism on the stationary shaft engages the sun gear and the ring gear to change the gear ratio of the drive.

An aspect of the invention involves a multi-speed drive for a supercharger in which a planetary gear mechanism mounted for rotation on a stationary shaft receives a rotary-mechanical input via a ring gear and provides a rotary-mechanical output by way of a planet carrier. A hydraulically-actuated, multiplate clutch assembly mounted coaxially with the planetary gear mechanism on the stationary shaft engages a sun gear and the ring gear. The multiplate clutch assembly is operable in a first state to unlock the sun gear assembly from the ring gear, and is operable in a second state to lock the sun gear assembly and the ring gear together. A one-way roller clutch disposed coaxially with the planetary gear mechanism is operable to prevent rotation of the sun gear assembly when the sun gear assembly is unlocked from the ring gear.

In some instances of the invention a drive input from the engine is received by the ring gear, and the drive output for the supercharger is taken from the planet carrier. In a low speed drive mode, the multiplate clutch assembly unlocks the sun gear assembly from the ring gear while the one-way clutch prevents the sun gear assembly from rotating, causing the ring gear to rotate the planet carrier at a first speed. In a high speed drive mode, the multiplate clutch assembly locks the sun gear assembly to the ring gear, causing all three planetary gear elements to rotate at a second speed which is higher than the first speed.

Another aspect of the invention involves a multi-speed drive for a supercharger in which a planetary gear mechanism mounted for rotation on a stationary shaft receives a rotary-mechanical input via a planet carrier and provides a rotary-mechanical output by way of a ring gear. A hydraulically-actuated, multiplate clutch assembly mounted coaxially with the planetary gear mechanism on the stationary shaft engages a sun gear and the ring gear. The multiplate clutch assembly is operable in a first state to unlock the sun gear assembly from the ring gear, and is operable in a second state to lock the sun gear assembly and the ring gear together. A one-way roller clutch disposed coaxially with the planetary gear mechanism is operable to prevent rotation of the sun gear assembly when the sun gear assembly is unlocked from the ring gear.

In some other instances of the invention a drive input from the engine is received by the planet carrier and the drive output for the supercharger is taken from the ring gear. In a high speed drive mode, the multiplate clutch assembly unlocks the sun gear assembly from the ring gear while the one-way clutch prevents the sun gear assembly from rotating, causing the planet carrier to rotate the ring gear at a first speed. In a low speed drive mode, the multiplate clutch assembly locks the sun gear assembly to the ring gear, causing all three planetary gear elements to rotate at a second speed which is lower than the first speed.

DETAILED DESCRIPTION OF THE PREFERRED EMBODIMENTS

Generally, a multi-speed supercharger drive according to this specification is embodied in an internal combustion vehicle engine including an air handling system equipped with a supercharger powered by rotary mechanical motion coupled from a crankshaft. In this regard, see the example illustrated in FIG. 2 of commonly-owned U.S. Ser. No. 13/926,360, published as US 2014/0373814 A1 on Dec. 25, 2014. The rotary mechanical motion may be coupled by chain, belt, shaft or gear, or, possibly, other devices. In many instances, a supercharger provides intake boost in response to demand for acceleration of the engine. In two-stroke engines of the opposed-piston type, a supercharger provides boost and also provides positive charge air pressure to the cylinders for scavenging and, in some instances, for EGR. In any case, the engine may be turbocharged, or not.

Figure 1:
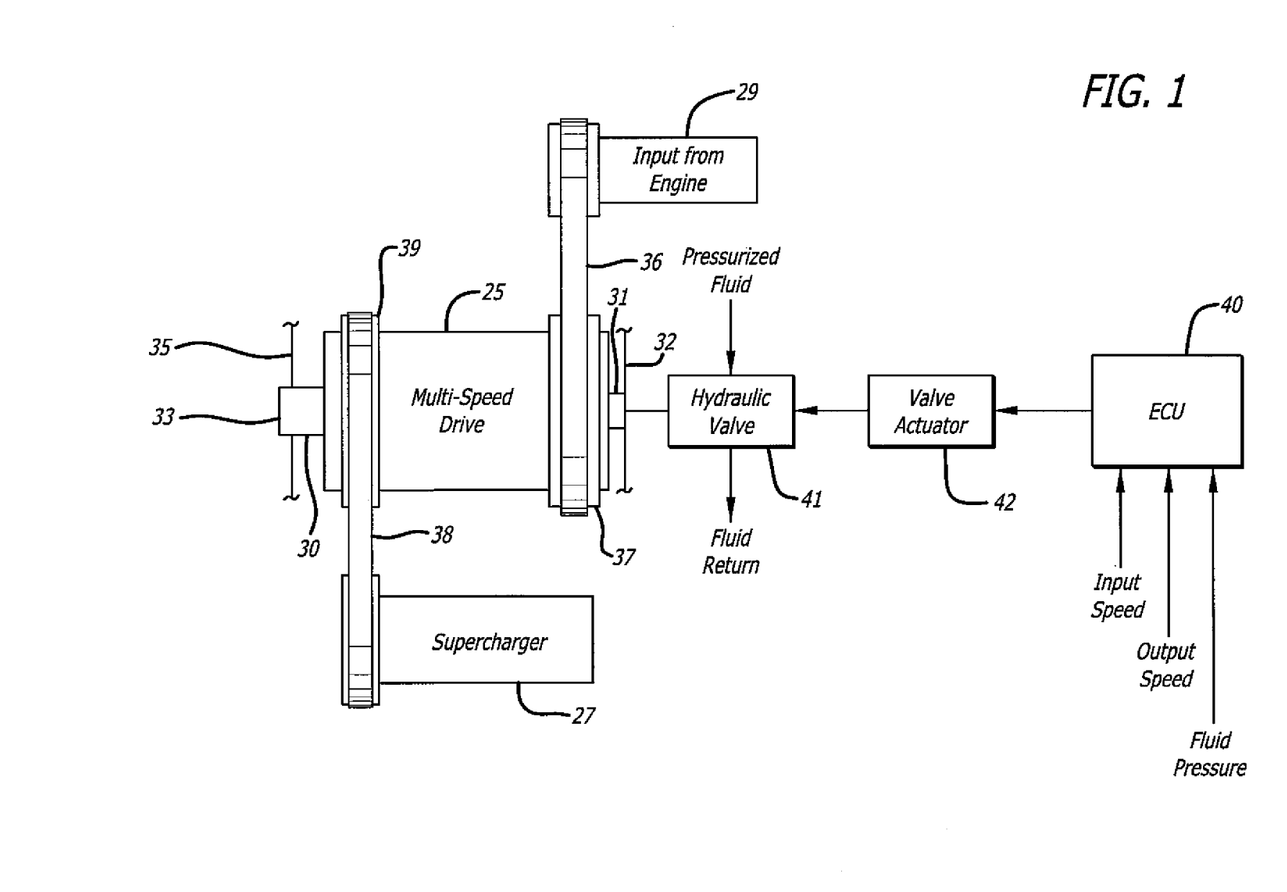
FIG. 1 is a schematic illustration of a multi-speed drive arrangement for a supercharger.

Referring to FIG. 1, a multi-speed drive 25 according to the invention is provided to control the speed of the supercharger 27 that is driven by an engine 29. The multi-speed drive 25 includes a stationary shaft 30 fixed in a housing. A first end 31 of the stationary shaft 30 is secured to one wall 32 of the housing and a second end 33 of the stationary shaft 30 is secured to an opposing wall 35 of the housing in a simply supported configuration. The multi-speed drive 25 receives a rotary mechanical input 36 from the engine 29 by way of, for example, a chain, belt, shaft or gear, or, possibly, another device. The input is received on a rotary element 37 of the drive 25 such as a pulley or a gear. Alternatively, the input of the multi-speed drive 25 may also be mounted directly on an engine crankshaft. The multi-speed drive 25 provides a rotary mechanical output 38 to the supercharger 27 by way of, for example, a chain, belt, shaft, or gear, or, possibly, another device. Alternatively, the output of the multi-speed drive may be mounted directly on the drive snout of the supercharger. The output is provided on a rotary element 39 of the drive 25 such as a pulley. Preferably, the multi-speed drive 25 includes a two-speed transmission constituted of a planetary gear assembly that is operated by a multistate clutch under control of a programmed engine control unit (ECU) 40. For example, the clutch may be a multiplate clutch, a cone clutch, or another equivalent. Preferably, but not necessarily, the multistate clutch is hydraulically actuated. In instances wherein the clutch is hydraulically-operated, clutch actuation, and thus control of the drive 25 is implemented with the ECU 40, a hydraulic valve 41, and a valve actuator 42. The ECU 40 receives input signals relative to the operating state of the engine 29, such as engine speed and torque, supercharger speed and torque, and hydraulic fluid pressure, and provides signals to the valve actuator 42 which sets the state of the hydraulic valve 41. According to one state of the valve 41, hydraulic fluid pressure is applied to the multi-speed drive via appropriate drillings in the stationary shaft 30. According to another state of the valve 41, the hydraulic pressure is relieved via a return fluid path. The hydraulic fluid is, preferably, lubricating oil, or an equivalent fluid. The valve 41 is preferably a solenoid valve.

Certain embodiments of the invention will be described now with reference to the FIGS. 2, 3, 4, and 5. The terminology used in the descriptions below is not to be interpreted in any limited or restrictive manner simply because it is used in conjunction with detailed descriptions of these embodiments. Furthermore, embodiments of the invention may include several novel features, no single one of which is solely responsible for its desirable attributes or which is essential to practicing the invention.

First Embodiment

Figure 2:
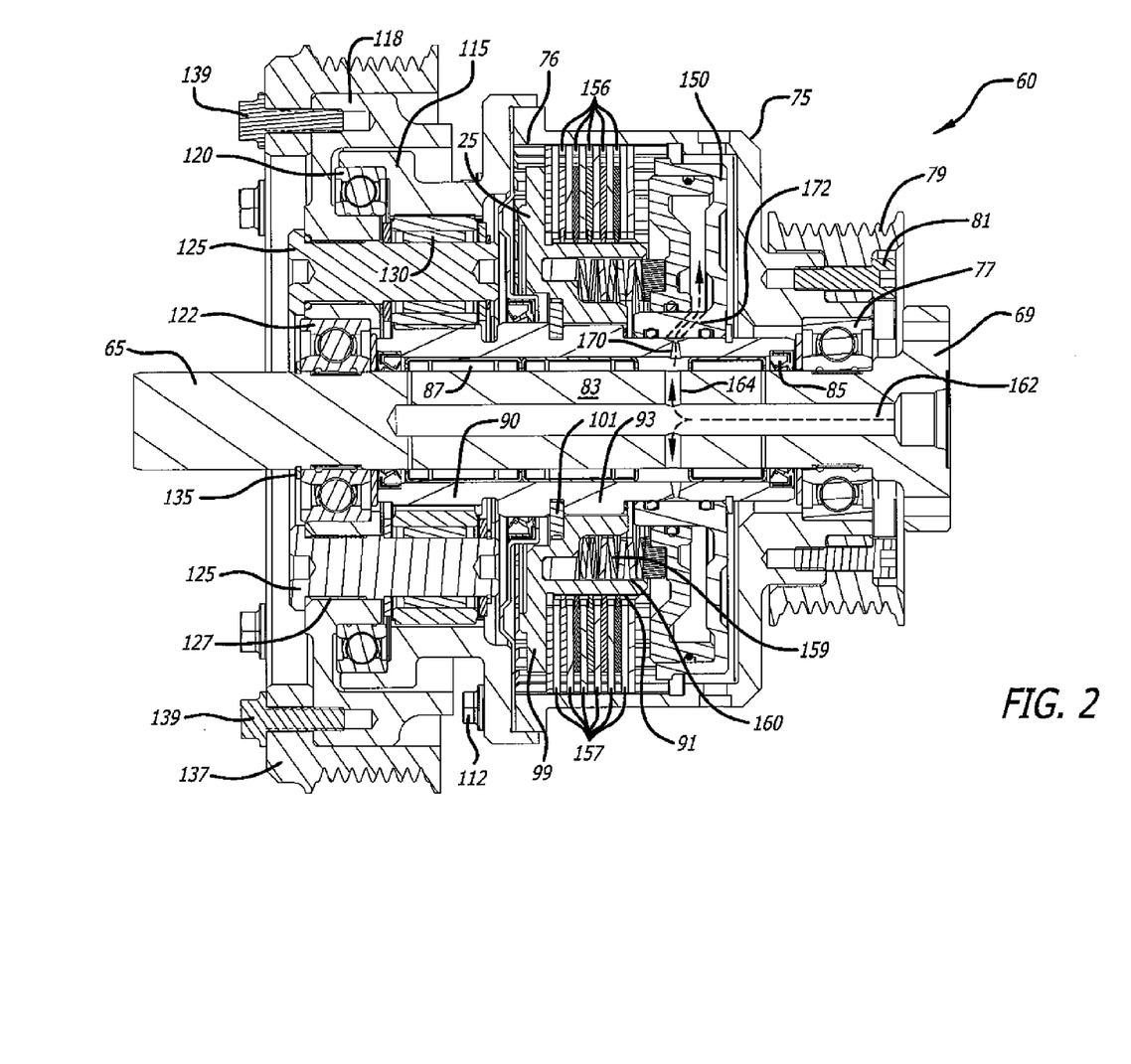
FIG. 2 is a cross section through an inventive embodiment of a multi-speed drive for a supercharger.
Figure 3:
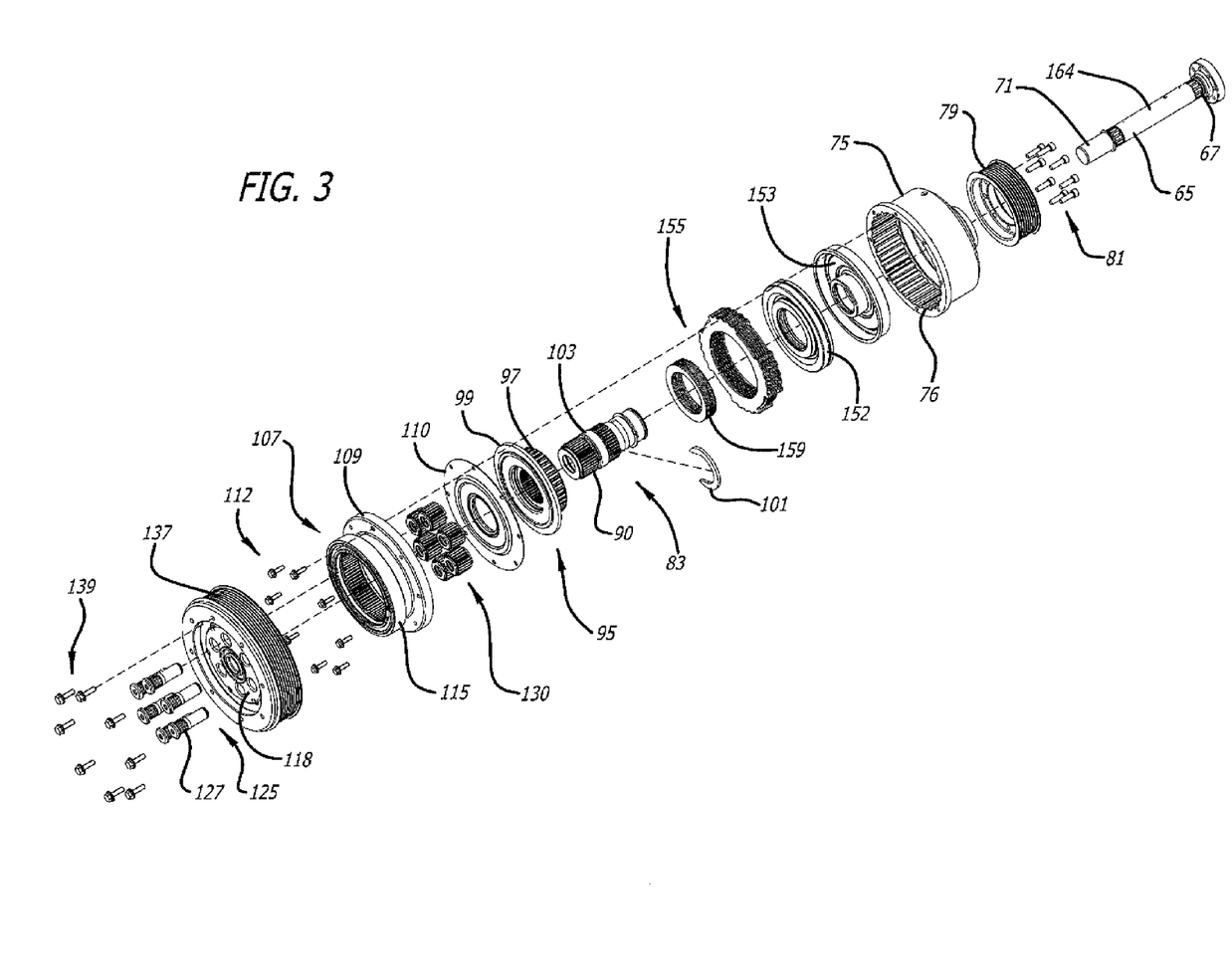
FIG. 3 is an exploded view, in perspective, showing an arrangement of elements of the multi-speed drive of FIG. 2.

FIGS. 2 and 3 illustrate a first embodiment of a multi-speed planetary drive for a supercharger in which a drive input from the engine is received by the ring gear, a drive output for the supercharger is taken from the planet carrier, and a mode of operation is selected by controlling the sun gear. In the first embodiment, a supercharger drive 60 with a two-speed transmission includes a stationary shaft 65 fixed in a housing. A first end 67 of the stationary shaft 65 is secured to one wall of the housing by threaded fasteners received in threaded holes of a flange 69 formed on the first end. The second end 71 of the stationary shaft 65 is supported in an opposing wall (not shown). A cylindrically-shaped clutch housing 75 with a splined inner annular wall portion 76 is supported for rotation on the stationary shaft 65 by a ring bearing 77. A dish-shaped, splined input pulley (or gear) 79 disposed coaxially with the clutch housing, between the flange 69 and the clutch housing 75, is attached to a rear surface of the clutch housing by threaded fasteners 81. A sun gear assembly 83 is supported for rotation on the stationary shaft 65 by a one-way roller clutch 87. The one-way roller clutch 87 is disposed coaxially with the sun gear assembly 83, between the sun gear assembly 83 and the stationary shaft 65. The sun gear assembly 83 has a generally cylindrical outer wall with a forward portion 90 in which axially-extending gear teeth are formed and a splined midsection 93. A clutch retainer assembly 95 has a hub 97 received over the outer wall of the sun gear assembly 83, and a flange 99. The hub 97 has a splined inner annular wall that meshes with the splined midsection 93 of the sun gear assembly 83 and a splined outer annular wall. The retainer assembly 95 is retained axially by a thrust washer 101 that is seated in a groove 103 in the outer wall of the sun gear 83 and engages an annular ridge in the flange 99. The clutch retainer assembly 97 has an annular cavity to accommodate a spring 159 which helps disengage the clutch. A ring gear 107 has a rear flange 109 that is secured coaxially to the clutch housing 75, with a separation plate 110 therebetween, by threaded fasteners 112. The ring gear 107 has a forward hub 115 with an inner annular wall on which axially-extending gear teeth are formed. A generally cylindrical planet carrier 118 has an annular groove that receives the forward hub 115 of the ring gear, with a ring bearing 120 retained therebetween to support relative rotation between the plant carrier 118 and the ring gear 107. The plant carrier 118 is supported for rotation on the stationary shaft 65 by a ring bearing 122. The plant carrier 118 is further provided with a circular array of planet pinions 125, each pinion being pressed into the planet carrier 118 using tolerance rings as at 127. A planet gear 130 is mounted for free rotation to a non-splined journal portion of each planet pinion 125. Gear teeth of each planet gear are meshed with gear teeth on the inner annular wall of the ring gear 107 and with gear teeth on the forward portion of the sun gear assembly 83. The planet carrier 118 is retained axially by a retaining ring 135 on the stationary shaft 65, near the second end. A dish-shaped output pulley 137 disposed coaxially with the plant carrier, is attached to a front surface of the planet carrier by threaded fasteners 139.

Thus assembled the supercharger drive 60 of FIGS. 2 and 3 has a planetary gear assembly in which the ring gear 107 receives the input drive via the clutch housing 75, the sun gear assembly 83 is the fixed input, and the plant carrier 118 provides the output drive. This supercharger drive is capable of two modes of operation. In a first mode of operation, providing a first, relatively low, gear ratio, the ring gear 107 rotates at the speed of the rotary mechanical drive applied to the input pulley 79, while rotation of the sun gear assembly 83 is locked by the one-way roller clutch 87, which causes the plant carrier to rotate at a lower speed than the ring gear 107. In the second mode of operation, providing a second, relatively high, gear ratio, the ring gear 107, the sun gear assembly 83, and the plant carrier 118 all rotate at the speed of the rotary mechanical drive applied to the input pulley 79.

Selection of the supercharger drive mode of operation is enabled by a clutch assembly that engages the sun gear assembly 83 and the ring gear 107. Preferably, the clutch assembly is a hydraulically-actuated, multiplate clutch assembly mounted coaxially with the planetary gear mechanism on the stationary shaft. In this regard, with reference to FIGS. 2 and 3, an annular piston support disc 150 is fitted into the bottom, smooth-walled portion of an inner annular wall of the sun gear assembly, 83 rearward of the splined portion 76. An annular piston disc 152 is slidably received in an annular trough 153 formed in the support disc 150. A set of annular clutch plates 155 is retained in the splined inner wall portion 76 of the clutch housing, between the piston disc 152 and the rear surface of the retainer flange 99. The clutch plates 155 include first clutch plates 156 which alternate with second clutch plates 157. The first clutch plates 156 have splines on their outer edges engaged with the splined inner wall portion 76 of the clutch housing. The second clutch plates 157 have splines on their inner edges engaged with splines formed on the outer wall of the hub 97 of the clutch retained assembly 95. A compressed return spring 159 is retained between the piston disc 152 and an annular trough formed on the interior portion of the retainer hub 97. The clutch assembly is actuated by provision of pressurized hydraulic fluid (preferably, lubricating oil) in the space between the piston support disc 150 and the piston disc 152. For example, the pressurized fluid may be transported through drillings 162 and 164 in the stationary shaft 65, and suitable drillings 170 and 172 through the sun gear assembly 83 and the piston support disc 150.

Presume that a rotary mechanical input from the crankshaft is applied to the input pulley, causing the pulley 79, the clutch housing 75, and the ring gear 107 to rotate in response to crankshaft rotation. Rotation of the ring gear 107 causes rotation of the planet gears 130, and thereby the planet carrier 118, in the same direction as the ring gear 107. Rotation of the planet carrier 118 is output to the supercharger via the output pulley 137.

With the hydraulically-actuated, multiplate clutch assembly illustrated in FIGS. 2 and 3, the first mode of the supercharger drive operation is enabled by an absence of fluid pressure in the space between the piston support disc 150 and the piston disc 152. This will cause the return spring 159 to move the piston disc 152 away from the clutch plates 150. Without pressure exerted by the piston disc 152, the first and second clutch plates 156 and 157 are not in close frictional contact; that is to say, the clutch is open. Without frictional contact between the clutch plates 150, the rotating planet gears 130 urge the sun gear assembly 83 to rotate in opposition to the ring gear 107 and the planet carrier 118, which tendency is prevented by the one-way roller clutch 87. The ring gear drives the planet gears alone, which lowers the rotational speed of the planet carrier 118 relative to the ring gear 107. Thus, the speed of the output pulley 137 and the speed of the supercharger driven thereby are lowered relative to the speed of the engine.

The second mode of the supercharger drive operation is indicated by the presence of fluid pressure in the space between the piston support disc 150 and the piston disc 152. This will cause the piston disc 152 to exert a mechanical pressure against the clutch plates 150. With pressure exerted by the piston disc 152, the first and second clutch plates 156 and 157 are brought into close frictional contact; that is to say, the clutch is closed. With frictional contact between the clutch plates 150, the sun gear assembly 83 is locked to the ring gear 107 and rotates in the same direction, and at the same speed, as the ring gear 107. This locks the planet carrier 118 between the sun gear assembly 83 and the ring gear 107 in a direct drive configuration in a direct drive configuration in which all three elements of the planetary gear assembly rotate together at the same speed. Thus, the speed of the output pulley 137 and the speed of the supercharger driven thereby are increased relative to the output speed of the drive in the first mode of operation.

Second Embodiment

Figure 4:
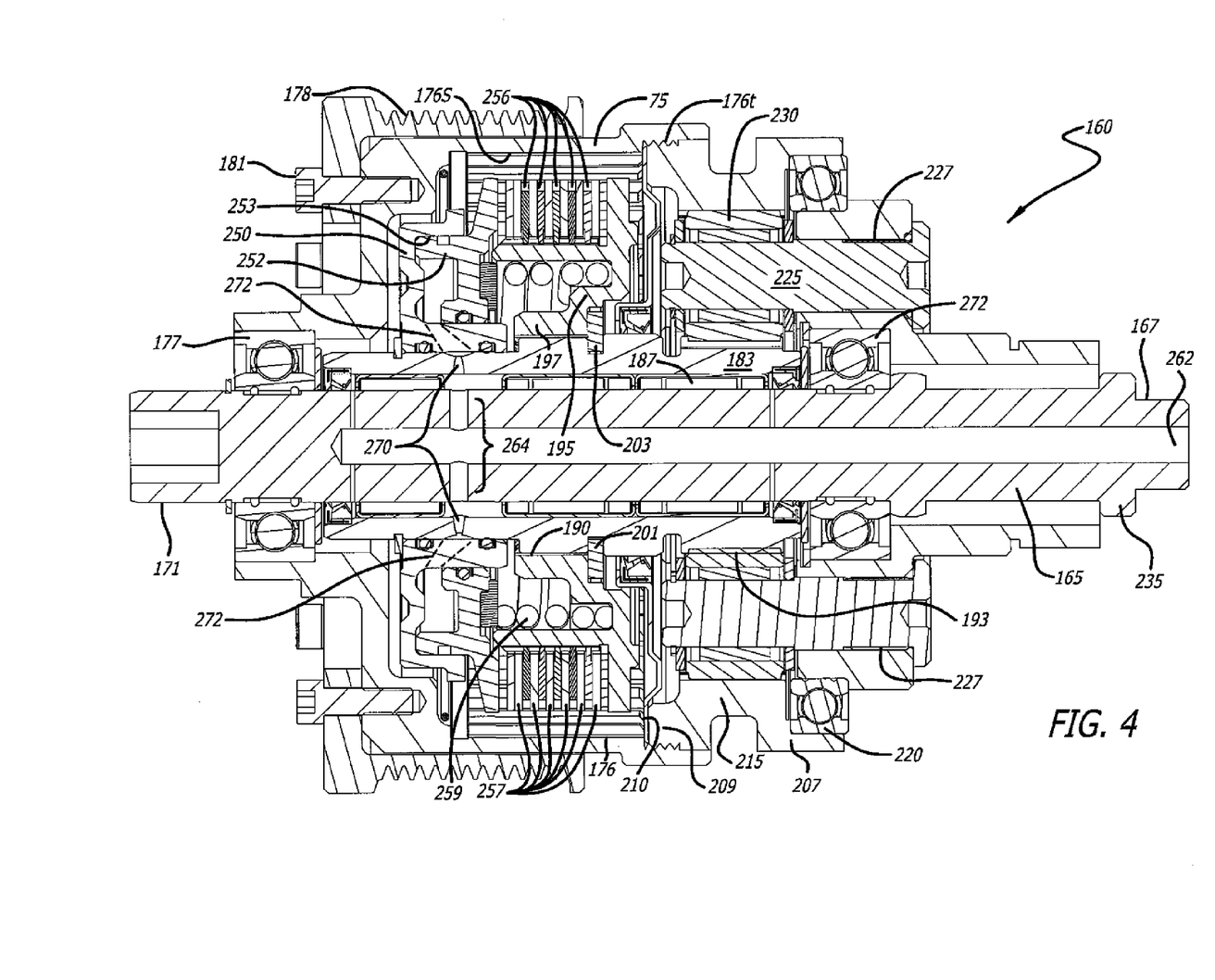
FIG. 4 is a cross section through another inventive embodiment of a multi-speed drive for a supercharger.
Figure 5:
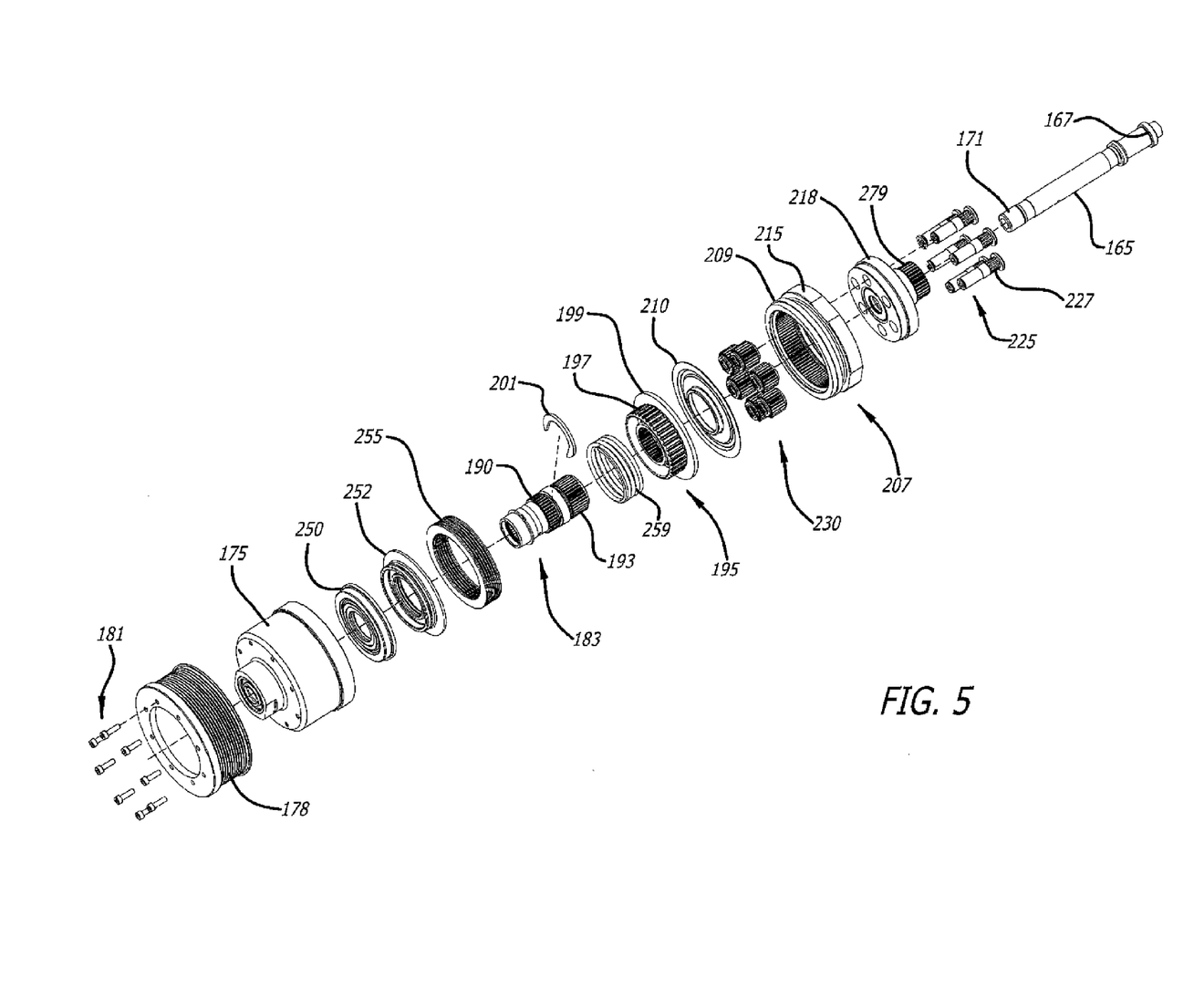
FIG. 5 is an exploded view, in perspective, showing an arrangement of elements of the multi-speed drive of FIG. 4.

FIGS. 4 and 5 illustrate a second embodiment of a multi-speed planetary drive for a supercharger in which a drive input from the engine is received by the planet carrier, a drive output for the supercharger is taken from the ring gear, and a mode of operation is selected by controlling the sun gear. In this regard, a supercharger drive 160 with a two-speed transmission includes a stationary shaft 165 fixed in a housing (not shown). A first end 167 of the stationary shaft 165 is secured to one wall of the housing. The second end 171 of the stationary shaft 165 is supported in an opposing wall of the housing. A cylindrically-shaped clutch housing 175 with an inner annular wall 176 is supported for rotation on the stationary shaft 165 by a ring bearing 177. The annular inner wall 176 includes an inner, splined portion 176$s$, and an outer, threaded portion 176$t$. A cylindrical output pulley 178 disposed coaxially with the clutch housing 175, adjacent the second end 171 of the stationary shaft 165, is attached to a front surface of the clutch housing by threaded fasteners 181. A sun gear assembly 183 is supported for rotation on the stationary shaft 165 by a one-way roller clutch 187. The one-way roller clutch 187 is disposed coaxially with the sun gear assembly 183, between the sun gear assembly 183 and the stationary shaft 165. The sun gear assembly 183 has a generally cylindrical outer wall with a splined midsection 190 and a rear section 193 in which axially-extending gear teeth are formed. A clutch retainer assembly 195 has a hub 197 received over the splined midsection 190 of the sun gear assembly 183, and a flange 199. The hub 197 has a splined inner annular wall that meshes with the splined midsection 190 of the sun gear assembly 183 and an outer annular wall with axial gear teeth formed thereon. The retainer assembly 195 is retained axially by a thrust washer 201 that is seated in a groove 203 in the outer wall of the sun gear assembly 183 and engages an annular ridge in the flange 199. A ring gear 207 has a forward flange 209 with external threads that is received in the threaded portion 176$t$ of clutch housing annular inner wall 176, with a separation plate 210 therebetween. The clutch housing 175 and the ring gear 207 are thereby threaded together in a direction opposite the direction of rotation of the ring gear 207, which retains the clutch housing 175 on the ring gear 207. The ring gear 207 has a rearward hub 215 with an inner annular wall on which axially-extending gear teeth are formed. A generally cylindrical planet carrier 218 has an annular groove that receives the rearward hub 215 of the ring gear, with a ring bearing 220 retained therebetween to support relative rotation between the planet carrier 218 and the ring gear 207. The planet carrier 218 is supported for rotation adjacent to the first end 167 of the stationary shaft 165 by a ring bearing 222. The planet carrier 218 is further provided with a circular array of planet pinions 225, each pinion being pressed into the planet carrier 218 using tolerance rings 227. A planet gear 230 is mounted for free rotation to a non-splined journal portion of each planet pinion 225. Gear teeth of each planet gear are meshed with gear teeth on the inner annular wall of the ring gear 207 and with gear teeth on the rearward portion of the sun gear assembly 183 The planet carrier 218 is retained axially by a flange 235 formed on the stationary shaft 165, near the first end 267. A rear portion of the planet carrier 218 is formed as an input pulley 279 disposed coaxially with the planet carrier 218.

Thus assembled the supercharger drive 160 of FIGS. 4 and 5 has a planetary gear assembly in which the planet carrier 218 receives the input drive via the input spline (or gear) 279, the sun gear assembly 183 is the fixed input, and the ring gear 207 provides the output drive via the clutch housing 175. This supercharger drive is capable of two modes of operation. In a first mode of operation, providing a first, relatively high, gear ratio, the planetary carrier 218 rotates at the speed of the rotary mechanical drive applied to the input pulley 279, while rotation of the sun gear assembly 183 is blocked by the one-way roller clutch 187, which causes the ring gear 207 to rotate at a higher speed than the planet carrier 218. In the second mode of operation, providing a second, relatively low, gear ratio, the plant carrier 218, the sun gear assembly 183, and the ring gear 207 all rotate together at the lower speed of the rotary mechanical drive applied to the input pulley 279.

Selection of the supercharger drive mode of operation is enabled by a clutch assembly that engages the sun gear assembly 183 and the ring gear 207. Preferably, the clutch assembly is a hydraulically-actuated, multiplate clutch assembly mounted coaxially with the planetary gear mechanism on the stationary shaft. In this regard, with reference to FIGS. 3 and 4, an annular piston support disc 250 is fitted into the bottom, smooth-walled portion of the inner annular wall of the sun gear assembly 183, forward of the splined portion 176s. An annular piston disc 252 is slidably received in an annular trough 253 formed in the support disc 250. A set of annular clutch plates 255 is retained in the splined inner wall portion 176 of the clutch housing, between the piston disc 252 and the forward surface of the retainer flange 199. The clutch plates 255 include first clutch plates 256 which alternate with second clutch plates 257. The first clutch plates 256 have splines on their outer edges engaged with the splined inner wall portion 176s of the clutch housing. The second clutch plates 257 have splines on their inner edges engaged with splines formed on the outer wall of the hub 197 of the clutch retainer assembly 195. A compressed return spring 259 is retained between the piston disc 252 and an annular trough formed on the interior portion of the of the retainer hub 197. The clutch assembly is actuated by provision of pressurized hydraulic fluid (preferably, lubricating oil) in the space between the piston support disc 250 and the piston disc 252. For example, the pressurized fluid may be transported through drillings 262 and 264 in the stationary shaft 165, and suitable drillings 270 and 272 through the sun gear assembly 183 and the piston support disc 250.

Presume that a rotary mechanical input from the engine is applied to the input pulley, causing the pulley 279 and the planet carrier 218 to rotate in response to crankshaft rotation. Rotation of the planet carrier 218 causes rotation of the planet gears 230 thereby rotating the ring gear 207 in the same direction as the planetary carrier 218. Rotation of the ring gear 207 is output to the supercharger via the clutch housing 175 and the output pulley 178.

With the hydraulically-actuated, multiplate clutch assembly illustrated in FIGS. 4 and 5, the first mode of the supercharger drive operation is enabled by an absence of fluid pressure in the space between the piston support disc 250 and the piston disc 252. This will cause the return spring 259 to move the piston disc 252 away from the clutch plates 255. Without pressure exerted by the piston disc 252, the first and second clutch plates 256 and 257 are not in close frictional contact; that is to say, the clutch is open. Without frictional contact between the clutch plates 255, the rotating planet gears 230 urge the sun gear assembly 183 to rotate in opposition to the ring gear 207 and the planet carrier 218, which tendency is prevented by the one-way roller clutch 187. The planet gears 230 now drive only the ring gear, which increases the rotational speed of the ring gear 207 relative to the planet carrier 218. Thus, the speed of the output pulley 279 and the speed of the supercharger driven thereby are increased relative to the speed of the engine.

The second mode of the supercharger drive operation is indicated by the presence of fluid pressure in the space between the piston support disc 250 and the piston disc 252. This will cause the piston disc 252 to exert a mechanical pressure against the clutch plates 255. With pressure exerted by the piston disc 252, the first and second clutch plates 256 and 257 are brought into close frictional contact; that is to say, the clutch is closed. With frictional contact between the clutch plates 255, the sun gear assembly 183 is locked to the ring gear 207 and rotates in the same direction, and at the same speed, as the ring gear 207. This locks the planet carrier 218 between the sun gear assembly 183 and the ring gear 207 in a direct drive configuration in which all three elements of the planetary gear assembly rotate at the same speed. Thus, the speed of the output pulley and the speed of the supercharger driven thereby are decreased relative to the output speed of the drive in the first mode of operation.

The foregoing description details certain embodiments of the invention. However, no matter how detailed the foregoing appears in text, the invention can be practiced in many additional ways. Furthermore, use of particular terminology when describing certain features or aspects of the invention is not meant to imply that the terminology is being redefined herein to be restricted to including any specific characteristics of the features or aspects of the invention with which that terminology is associated. The scope of the invention described hereinabove is therefore to be determined solely by the language of the following claims.

The invention claimed is:

1. A multi-speed drive for a supercharger, comprising:
   a stationary shaft;
   a planetary gear mechanism with a sun gear assembly, a plurality of planet gears mounted on a planet carrier, and a ring gear, all mounted for rotation on the stationary shaft;
   a rotary-mechanical drive input being received by either the ring gear or the planet carrier, and a rotary-mechanical drive output being provided by the planet carrier when the ring gear receives the input, or by the ring gear when the planet carrier receives the input;
   a one-way roller clutch disposed coaxially with the planetary gear mechanism, between the sun gear assembly and the stationary shaft; and,
   a hydraulically-actuated clutch assembly mounted coaxially with the planetary gear mechanism on the stationary shaft, and operably engaging the sun gear assembly and the ring gear to change a gear ratio of the multi-speed drive.

2. The multi-speed drive of claim 1, in which:
   the planetary gear mechanism receives the rotary-mechanical input via the ring gear and provides the rotary-mechanical output by way of a planet carrier;

the clutch assembly is operable in a first state to unlock the sun gear assembly from the ring gear, and is operable in a second state to lock the sun gear assembly and the ring gear together;

the one-way roller clutch is disposed to prevent rotation of the sun gear assembly when the sun gear assembly is unlocked from the ring gear.

3. The multi-speed drive of claim 2, wherein, in the first state, when the sun gear assembly is unlocked from the ring gear while the sun gear assembly is prevented from rotating, the ring gear is operable to rotate the planet carrier at a first speed, and, in the second state, when the sun gear assembly is locked to the ring gear, the ring gear, the sun gear assembly, and the planet carrier are operable to rotate together at a second speed that is higher than the first speed.

4. The multi-speed drive of claim 2 or claim 3, in which the hydraulically-actuated clutch assembly is a multiplate clutch assembly.

5. The multi-speed drive of claim 1, in which:
the planetary gear mechanism receives the rotary-mechanical input via the planet carrier and provides the rotary-mechanical output by way of the ring gear;
the clutch assembly is operable in a first state to unlock the sun gear assembly from the ring gear, and is operable in a second state to lock the sun gear assembly and the ring gear together; and,
the one-way roller clutch is disposed to prevent rotation of the sun gear assembly when the sun gear assembly is unlocked from the ring gear.

6. The multi-speed drive of claim 5, wherein, in the first state, when the sun gear assembly is unlocked from the ring gear while the sun gear assembly is prevented from rotating, the planet carrier is operable to rotate the ring gear at a first speed, and, in the second state, when the sun gear assembly is locked to the ring gear, the ring gear, the sun gear assembly, and the planet carrier are operable to rotate together at a second speed that is lower than the first speed.

7. The multi-speed drive of claim 5 or claim 6, in which the hydraulically-actuated clutch assembly is a multiplate clutch assembly.

8. A multi-speed drive for a supercharger, in which:
a planetary gear mechanism mounted for rotation on a stationary shaft receives a rotary-mechanical input via a ring gear and provides a rotary-mechanical output by way of a planet carrier;
a hydraulically-actuated clutch assembly mounted coaxially with the planetary gear mechanism on the stationary shaft engages a sun gear assembly and the ring gear;
the clutch assembly is operable in a first state to unlock the sun gear assembly from the ring gear, and is operable in a second state to lock the sun gear assembly and the ring gear together;
a one-way roller clutch is disposed coaxially with the planetary gear mechanism to prevent rotation of the sun gear assembly when the sun gear assembly is unlocked from the ring gear.

9. The multi-speed drive of claim 8, in which the hydraulically-actuated clutch assembly is a multiplate clutch assembly.

10. The multi-speed drive of claim 8, wherein, in the first state, when the sun gear assembly is unlocked from the ring gear while the sun gear assembly is prevented from rotating, the ring gear is operable to rotate the planet carrier at a first speed, and, in the second state, when the sun gear assembly is locked to the ring gear, the ring gear, the sun gear assembly, and the planet carrier are operable to rotate together at a second speed that is higher than the first speed.

11. The multi-speed drive of claim 10, in which the hydraulically-actuated clutch assembly is a multiplate clutch assembly.

12. A multi-speed drive for a supercharger, in which:
a planetary gear mechanism mounted for rotation on a stationary shaft receives a rotary-mechanical input via a planet carrier and provides a rotary-mechanical output by way of a ring gear;
a hydraulically-actuated clutch assembly mounted coaxially with the planetary gear mechanism on the stationary shaft engages a sun gear assembly and the ring gear;
the clutch assembly is operable in a first state to unlock the sun gear assembly from the ring gear, and is operable in a second state to lock the sun gear assembly and the ring gear together; and,
a one-way roller clutch is disposed coaxially with the planetary gear mechanism to prevent rotation of the sun gear assembly when the sun gear assembly is unlocked from the ring gear.

13. The multi-speed drive of claim 12, in which the hydraulically-actuated clutch assembly is a multiplate clutch assembly.

14. The multi-speed drive of claim 12, wherein, in the first state, when the sun gear assembly is unlocked from the ring gear while the sun gear assembly is prevented from rotating, the planet carrier is operable to rotate the ring gear at a first speed, and, in the second state, when the sun gear assembly is locked to the ring gear, the ring gear, the sun gear assembly, and the planet carrier are operable to rotate together at a second speed that is lower than the first speed.

15. The multi-speed drive of claim 14, in which the hydraulically-actuated clutch assembly is a multiplate clutch assembly.

* * * * *

UNITED STATES PATENT AND TRADEMARK OFFICE
CERTIFICATE OF CORRECTION

| | |
|---|---|
| PATENT NO. | : 9,927,006 B2 |
| APPLICATION NO. | : 14/841969 |
| DATED | : March 27, 2018 |
| INVENTOR(S) | : Kashyap et al. |

It is certified that error appears in the above-identified patent and that said Letters Patent is hereby corrected as shown below:

In the Specification

-- Column 6, Line 64, delete "222"

-- Column 7, Line 6, delete "267" and replace with "167"

-- Column 7, Line 32, delete "FIGS. 3 and 4" and replace with "FIGS. 4 and 5"

Signed and Sealed this
First Day of May, 2018

Andrei Iancu
*Director of the United States Patent and Trademark Office*